(12) United States Patent
Patil

(10) Patent No.: US 10,045,105 B2
(45) Date of Patent: Aug. 7, 2018

(54) WIRELESS COMMUNICATION BETWEEN ENDPOINT DEVICES

(71) Applicant: Bose Corporation, Framingham, MA (US)

(72) Inventor: Naganagouda B. Patil, Ashland, MA (US)

(73) Assignee: Bose Corporation, Framingham, MA (US)

( * ) Notice: Subject to any disclaimer, the term of this patent is extended or adjusted under 35 U.S.C. 154(b) by 346 days.

(21) Appl. No.: 14/681,346

(22) Filed: Apr. 8, 2015

(65) Prior Publication Data

US 2016/0050476 A1 Feb. 18, 2016

Related U.S. Application Data

(63) Continuation-in-part of application No. 14/457,771, filed on Aug. 12, 2014, now Pat. No. 9,639,255.

(51) Int. Cl.
*G06F 3/0484* (2013.01)
*G06F 3/0486* (2013.01)
(Continued)

(52) U.S. Cl.
CPC ............ *H04R 1/08* (2013.01); *G06F 3/0486* (2013.01); *G06F 3/04842* (2013.01);
(Continued)

(58) Field of Classification Search
CPC ...... H04W 4/06; H04W 76/025; H04R 27/00; H04R 27/04; H04R 2420/07; H04R 1/08;
(Continued)

(56) References Cited

U.S. PATENT DOCUMENTS 7,905,696 B2 * 3/2011 Chiu .................. F16B 5/0208
411/107
8,443,289 B2 * 5/2013 Sahashi ................ G06F 3/0486
715/736
(Continued)

FOREIGN PATENT DOCUMENTS

EP 2073514 A2 6/2009
WO WO 2014/182241 A1 * 11/2014 ............... H04R 5/04

OTHER PUBLICATIONS

International Search Report and Written Opinion dated Nov. 27, 2015 for International application No. PCT/US2015/044775.
(Continued)

*Primary Examiner* — Kieu Vu
*Assistant Examiner* — Blaine T. Basom

(57) ABSTRACT

A system includes a first audio device having a first microphone, first speaker, and first wireless interface, a second audio device having a second speaker and second wireless interface, and a computing device having a user interface. The user interface presents representations of the first and second audio devices. Upon receiving user input indicating a connection between the representations of the first and second audio devices, the computing device inquires whether a first or second mode should be used. Upon receiving user input confirming the first mode should be used, the computing device instructs the first audio device to send audio signals detected by the first microphone to the second audio device, which reproduces the audio signals. The first mode is selected based on whether the first and second audio devices is a loudspeaker or a headset.

16 Claims, 14 Drawing Sheets

(51) Int. Cl.
*H04W 76/00* (2018.01)
*H04R 27/00* (2006.01)
*H04W 4/06* (2009.01)
*H04R 1/08* (2006.01)
*H04R 1/12* (2006.01)
*H04W 76/02* (2009.01)
*H04W 76/15* (2018.01)
*H04M 1/725* (2006.01)

(52) U.S. Cl.
CPC ...... *G06F 3/04847* (2013.01); *H04M 1/7253* (2013.01); *H04M 1/72544* (2013.01); *H04R 1/12* (2013.01); *H04R 27/00* (2013.01); *H04W 4/06* (2013.01); *H04W 76/025* (2013.01); *H04W 76/15* (2018.02); *H04M 2250/22* (2013.01); *H04R 2420/07* (2013.01)

(58) Field of Classification Search
CPC ..... H04R 1/12; G06F 3/0484; G06F 3/04842; G06F 3/04847; G06F 3/0486; H04M 1/7253; H04M 1/72544; H04M 2250/22
See application file for complete search history.

(56) References Cited

U.S. PATENT DOCUMENTS

| | | | |
|---|---|---|---|
| 8,737,639 B1* | 5/2014 | Ribeiro | H04R 27/00 |
| | | | 381/120 |
| 9,571,625 B2* | 2/2017 | Kim | H04M 1/7253 |
| 2003/0100274 A1* | 5/2003 | Brown | H01M 1/6066 |
| | | | 455/90.1 |
| 2007/0206829 A1 | 9/2007 | Weinans et al. | |
| 2010/0138794 A1 | 6/2010 | Ganey et al. | |
| 2013/0260672 A1 | 10/2013 | Patil et al. | |
| 2014/0256214 A1 | 9/2014 | Ramamoorthy et al. | |
| 2016/0092072 A1* | 3/2016 | So | G06F 3/04817 |
| | | | 345/173 |
| 2016/0150575 A1* | 5/2016 | Andersen | H04W 76/02 |
| | | | 370/329 |

OTHER PUBLICATIONS

European Search Report dated Jan. 17, 2016 for European Application No. 15178954.2-1792/2985986.
European Search Report dated Aug. 11, 2016 for European Application No. 16161561.2-1855.

* cited by examiner

WIRELESS COMMUNICATION BETWEEN ENDPOINT DEVICES

PRIORITY CLAIM

This application is a continuation-in-part of, and claims priority to, U.S. patent application Ser. No. 14/457,771, filed Aug. 12, 2014, the entire contents of which are hereby incorporated by reference.

BACKGROUND

This disclosure relates to a wireless communication between endpoint devices and the user experiences this enables.

As wireless capabilities are added to more and more devices, providing user interfaces that allow users to configure how such devices are interconnected becomes increasingly difficult. U.S. Patent Publication 2013/0260672, the entire contents of which are hereby incorporated by reference, describes a system by which a wireless device, such as a set of headphones, may relay messages from one connected endpoint device, such as a mobile phone, to another connected endpoint device, such as a tablet computer, such that the two endpoint devices behave as if they have a direct communication link between each other. Such an infrastructure also allows one of those endpoint devices to control not only its own connection to the wireless device, but that wireless device's connection to and interaction with the other endpoint device. Such complex interactions and the details describing them can be very confusing or intimidating for users. This application describes a graphical user interface for operating on such an end point device that intuitively shows the user what is connected, and allows the user to control the wireless device and its interconnections in a comfortable, natural manner.

SUMMARY

In general, in one aspect, a first audio device has a first microphone, a first speaker, and a first wireless interface for receiving audio signals for reproduction on the first speaker and sending audio signals detected by the first microphone. A second audio device has a second speaker and a second wireless interface for receiving audio signals for reproduction on the second speaker. A computing device has a user interface. The first audio device is configurable to send the audio signals detected by the first microphone directly to the second audio device and the second audio device is configurable to receive and reproduce the audio signals received from the first audio device. The first and second audio devices are each one of a loudspeaker or a headset. The computing device presents on the user interface representations of both the first and second audio devices. Upon receiving user input indicating a connection between the representations of the first and second audio devices, the computing device inquires from the user whether a first or a second mode is to be used. Upon receiving user input confirming that the first mode is to be used, the computing device instructs the first audio device to send the audio signals detected by the first microphone directly to the second audio device, and instructs the second audio device to receive and reproduce the audio signals received from the first audio device. The first mode presented by the user interface is selected based on whether each of the first and second audio devices is a loudspeaker or a headset.

Implementations may include one or more of the following, in any combination. When the first audio device is a headset and the second audio device is a loudspeaker, such that in the first mode, when a user of the headset speaks, the user's voice may be reproduced by the loudspeaker, the user interface identifies the first mode as a public address mode. When the first audio device is a first loudspeaker and the second audio device is a second loudspeaker, such that in the first mode, a user of the second loudspeaker can hear sounds present near the first loudspeaker, the user interface identifies the first mode as a baby monitor mode. When in the first mode, the user interface presents the user with an audio playback control that allows the user to select audio for playback on the first loudspeaker, independently of any audio being played back on the second loudspeaker. The second loudspeaker may have a second microphone, and the second loudspeaker may be configurable to send audio signals detected by the second microphone directly to the first loudspeaker, and the first loudspeaker may be configurable to receive and reproduce the audio signals received from the second loudspeaker. When in the first mode, the user interface may present the user with a push-to-talk control that causes the second audio device to transmit audio signals detected by the second microphone to the first loudspeaker.

When the first audio device is a first headset and the second audio device is a second headset having a second microphone, the second headset may be configurable to send audio signals detected by the second microphone directly to the first headset and the first headset may be configurable to receive and reproduce the audio signals received from the second headset, such that users of the first and second headsets can engage in a two-way conversation through the headsets, in which case the user interface identifies the first mode as a conversation mode. When the first audio device is a loudspeaker and the second audio device is a headset, such that when sound is present in the environment of the loudspeaker, the sound may be reproduced by the headset, the user interface identifies the second mode as a remote listening mode. When one of the first audio device or the second audio device is a headset and the other audio device is a loudspeaker, the user interface may identify the first mode as either a public address mode or a remote listening mode, depending on the order in which the audio devices were connected to the computing device. When one of the first audio device or the second audio device is a headset and the other audio device is a loudspeaker, the user interface may identify the first mode as a public address mode and the second mode as a remote listening mode.

Advantages include providing a user with an intuitive understanding of and control over their interconnected devices, and providing peer-to-peer audio device modes with an intuitive interface to understand the uses of such modes.

All examples and features mentioned above can be combined in any technically possible way. Other features and advantages will be apparent from the description and the claims.

DESCRIPTION

Figure 1:
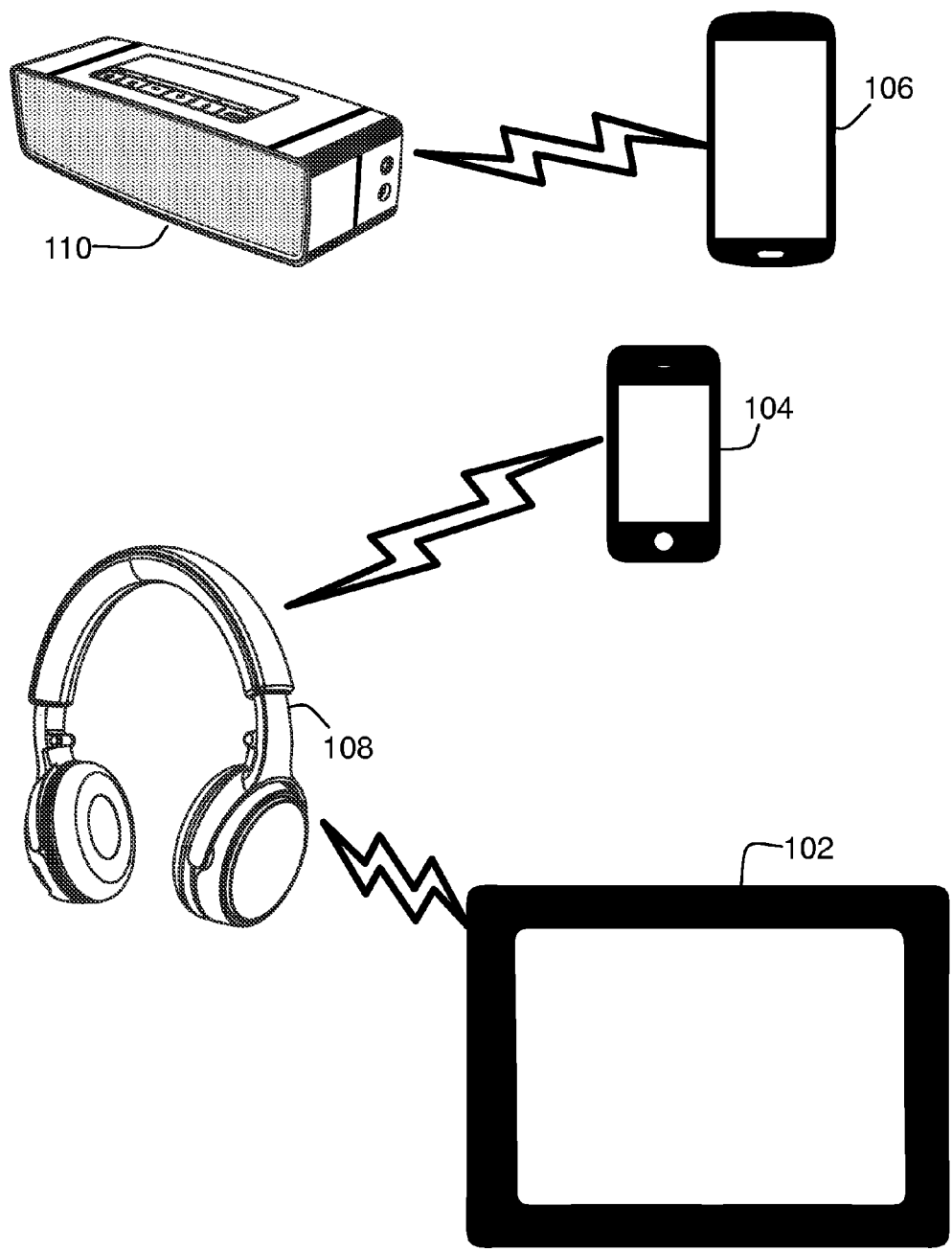
FIG. 1 shows a system of interconnected electronic devices.
Figure 2:
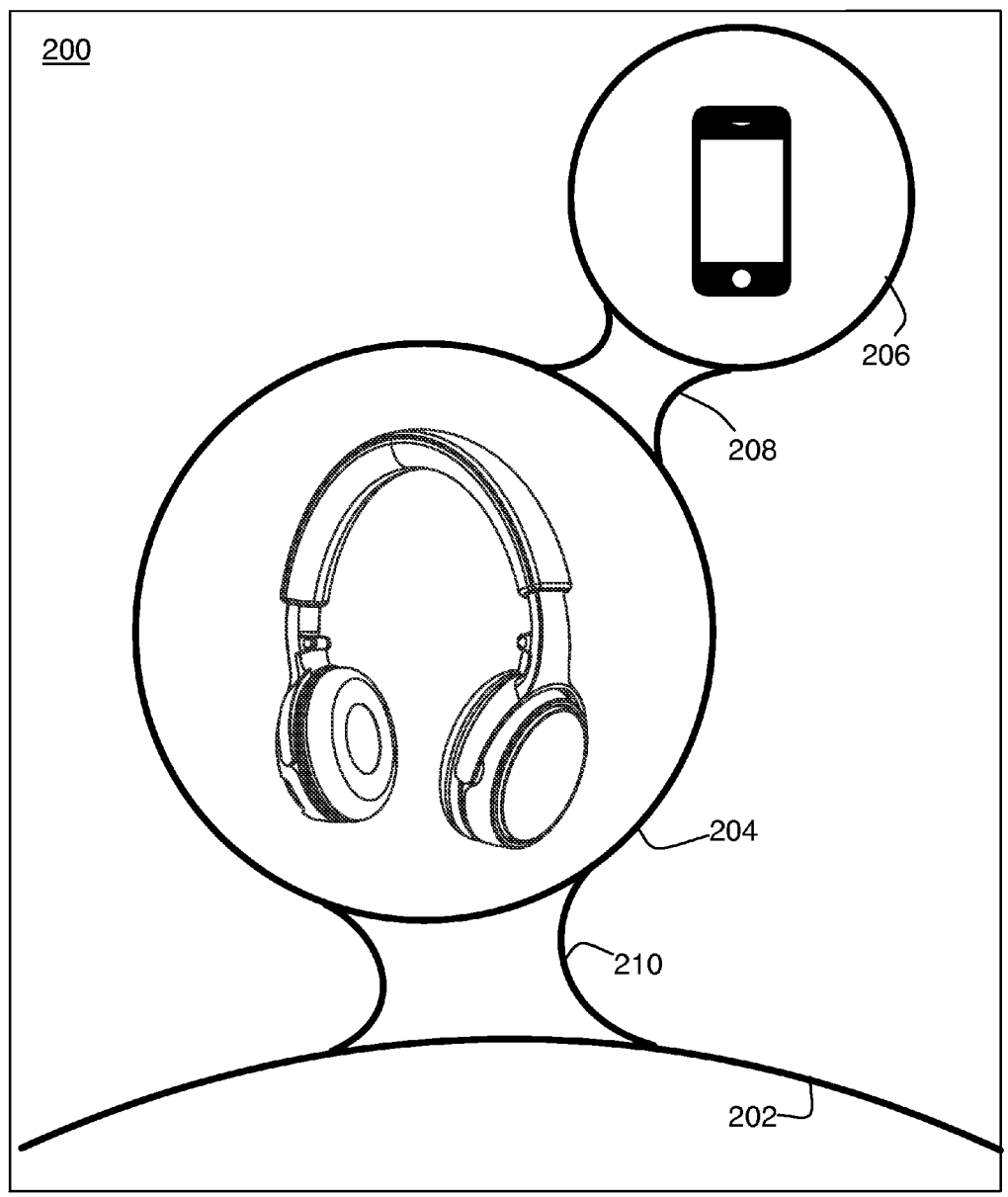
FIGS. 2 through 9 and 11 through 13 show screens of a user interface for one or more of the devices of FIG. 1.

FIG. 1 shows a representative collection of devices and the wireless connections between them. FIGS. 2 though 9 show various screens of the user interface which show to the user the collection of devices and interconnections depicted in FIG. 1 in various states of operation. In FIG. 1, a first endpoint device 102 is a tablet computer. A second endpoint device 104 is a mobile phone. A third endpoint device 106 is another mobile phone. A first wireless device 108 is a set of headphones. A second wireless device 110 is a portable speaker. In an initial state shown in FIG. 1, the tablet and first mobile phone are paired with the headphones, and the second mobile phone is paired with the speaker. The wireless links between devices are commonly made using Bluetooth® wireless technology, but may also be made using WiFi® wireless technology or any other suitable wireless connection. In the examples that follow, the screen of a tablet computer is used, and a set of headphones are shown as examples only; the interface described is not limited to such devices.

In FIG. 2, a screen 200 that would be shown on the tablet computer 102, a partial circle or arc 202 at the bottom of the screen represents the tablet itself. A first full circle 204 represents the headphones 108, and a second full circle 206 represents the mobile phone 104. Tapered connectors 208 and 210 between the circles represent the wireless connections between the headphones and the two endpoint devices. This allows the user to easily observe that the device he's holding, represented by the partial circle that if complete would surround the user himself, is connected to the headphones, which are also connected to the first mobile phone. The connections are shown as a pair of curved lines extending from one arc or circle to the other circle, with the lines curved slightly towards each other. In some examples, the space between the curved lines is filled with a solid color. In some examples, a symbol, icon, or text may be displayed within the connector to indicate the nature of the connection, such as a Bluetooth icon to represent a Bluetooth connect, or a WiFi icon to indicate that the devices are connected over WiFi. In other examples, the color of the fill may indicate the type of connection. Text may also be used within the arc and circles to identify the devices, in place of or in addition to visual representations of the devices.

Figure 3:
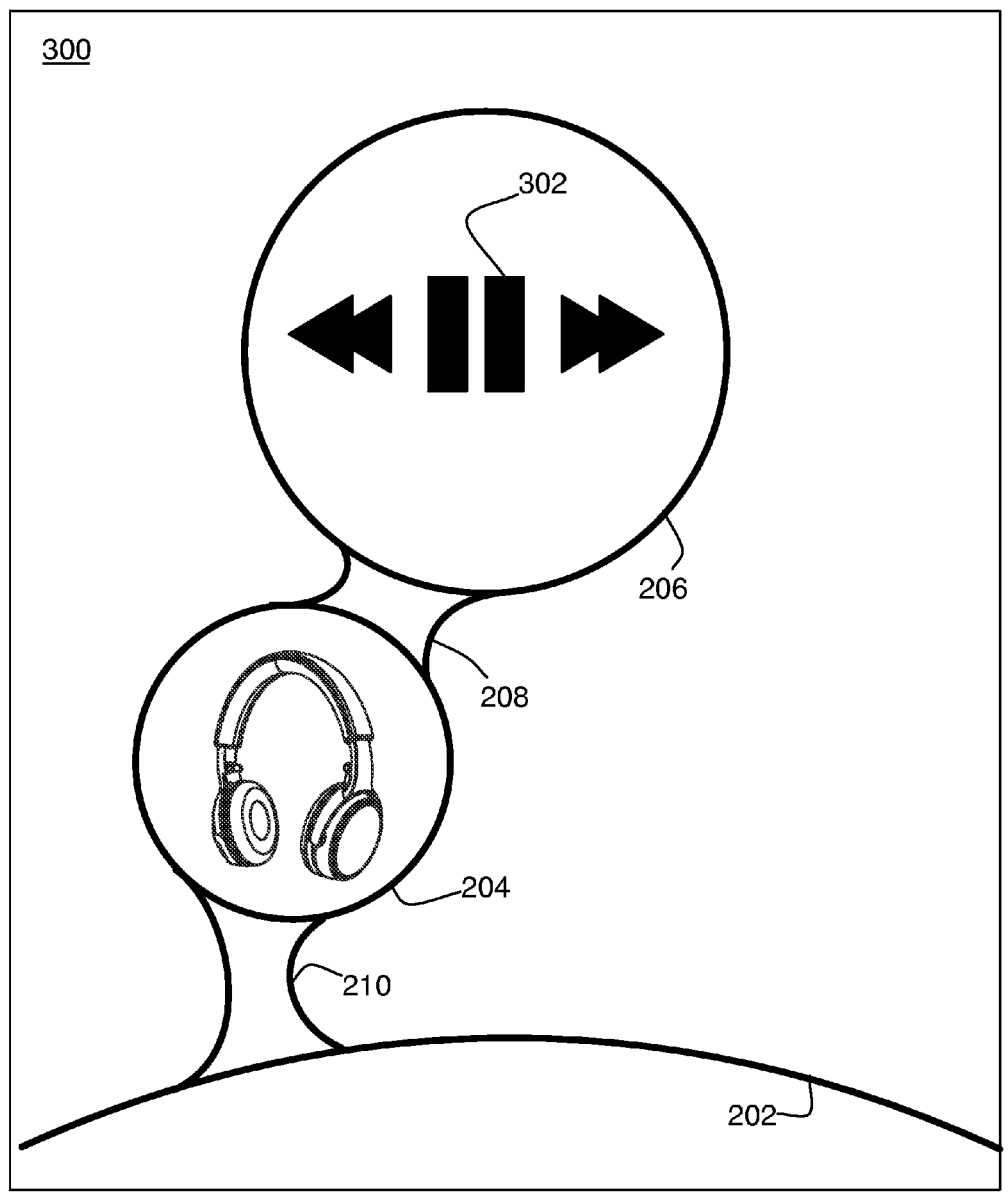

Another aspect of the user interface is shown by screen 300 in FIG. 3. In this screen, the mobile phone represented by circle 206 is providing audio to the headphones. To show this, the circle 204 is decreased in size, and the circle 306 is increased in size. The circle 206 shows transport controls 302 (e.g., pause, last track, next track), and could also show information about the audio, such as a track name, album name, or cover art, to name a few examples. Pressing the controls in the user interface of the device showing the screen 300 results in that device informing the headphones of the action, so that the headphones can relay the command to the remote device which will respond to it.

Figure 4A:
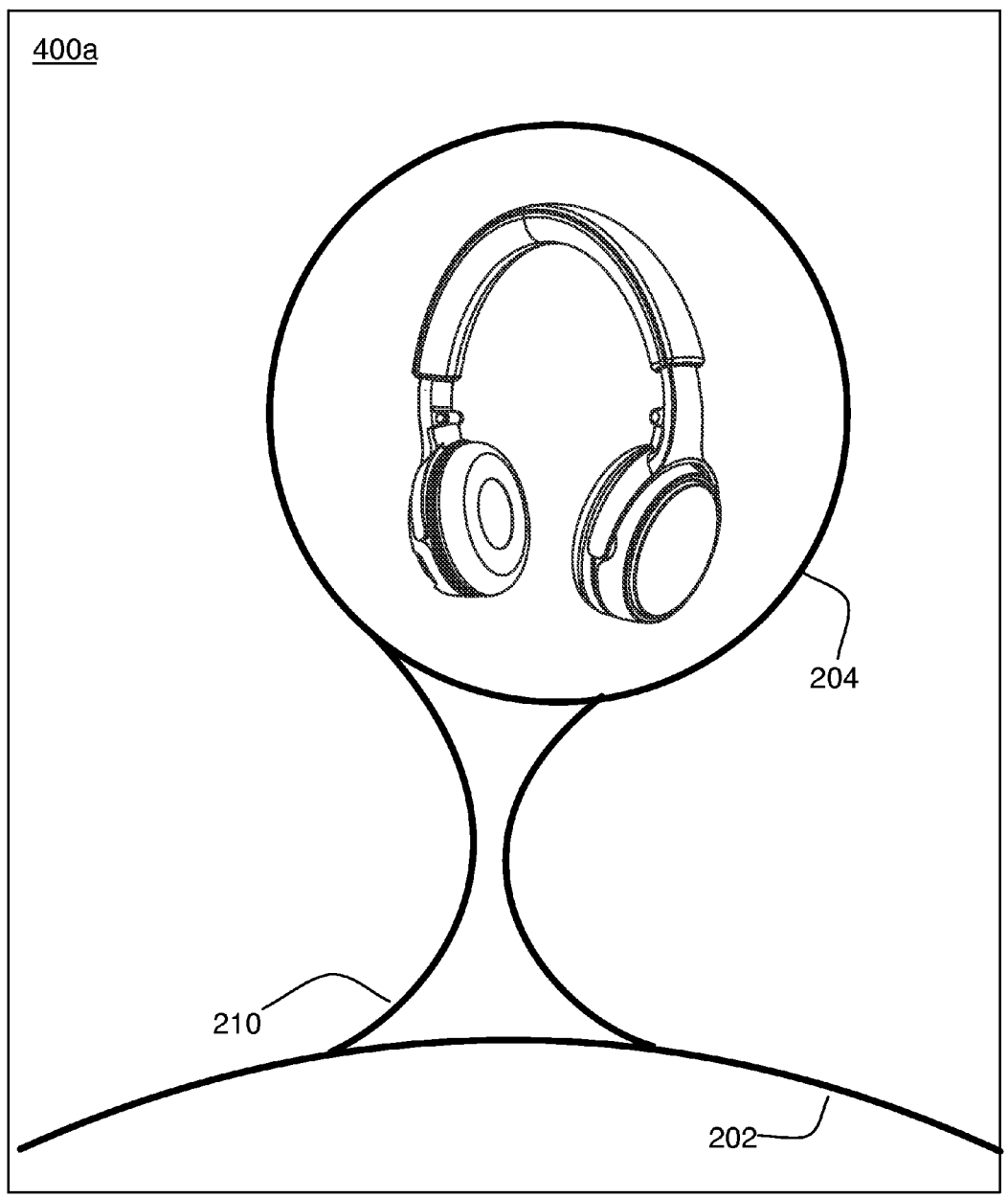
Figure 4B:
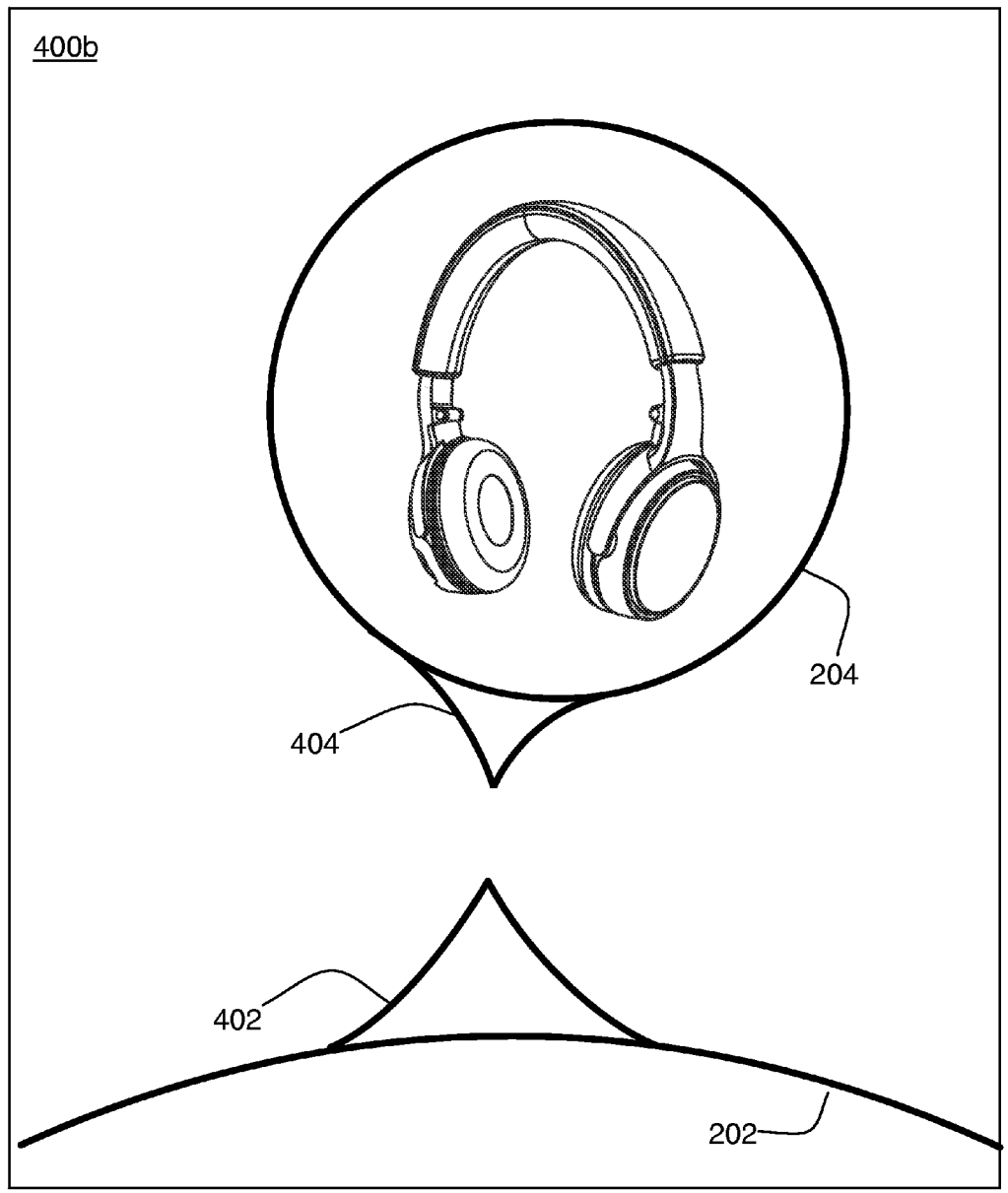

In FIGS. 4A and 4B, a similar screen 400a, 400b shows how the graphical interface responds to user input to show the user what is going to happen in response to the input. Specifically, in screen 400a, a user is dragging the circle 204 representing the headphones away from the arc 202 representing the tablet displaying the interface. This gesture tells the headphones to disconnect from the tablet. As the user drags the circle away from the arc, the connector 210 narrows, as shown in FIG. 4A, until it breaks, as shown by points 402 and 404 in FIG. 4B, indicating intuitively that the user is breaking the connection to the headphones. In actual practice, it may be desired to animate the breaking of the connection before actually breaking it, and only committing to the disconnection after the user releases the circle or holds it away for some predetermined amount of time after the break is shown. If the user brings the circle back to the arc, the animation shows the connection being restored, returning to the screen 400a, and the headphones are not disconnected. Once the user has broken the connection in the user interface, the tablet transmits to the headphones a command to disconnect itself from the tablet. Alternatively, the tablet may simply turn off the connection itself, but that may leave the headphones in an uncertain state. The same interface may be used for disconnecting the remote device represented by circle 206 in FIG. 2 from the headphones, by dragging the circle 206 away from the circle 204 until the connector 208 breaks (not shown).

Figure 5:
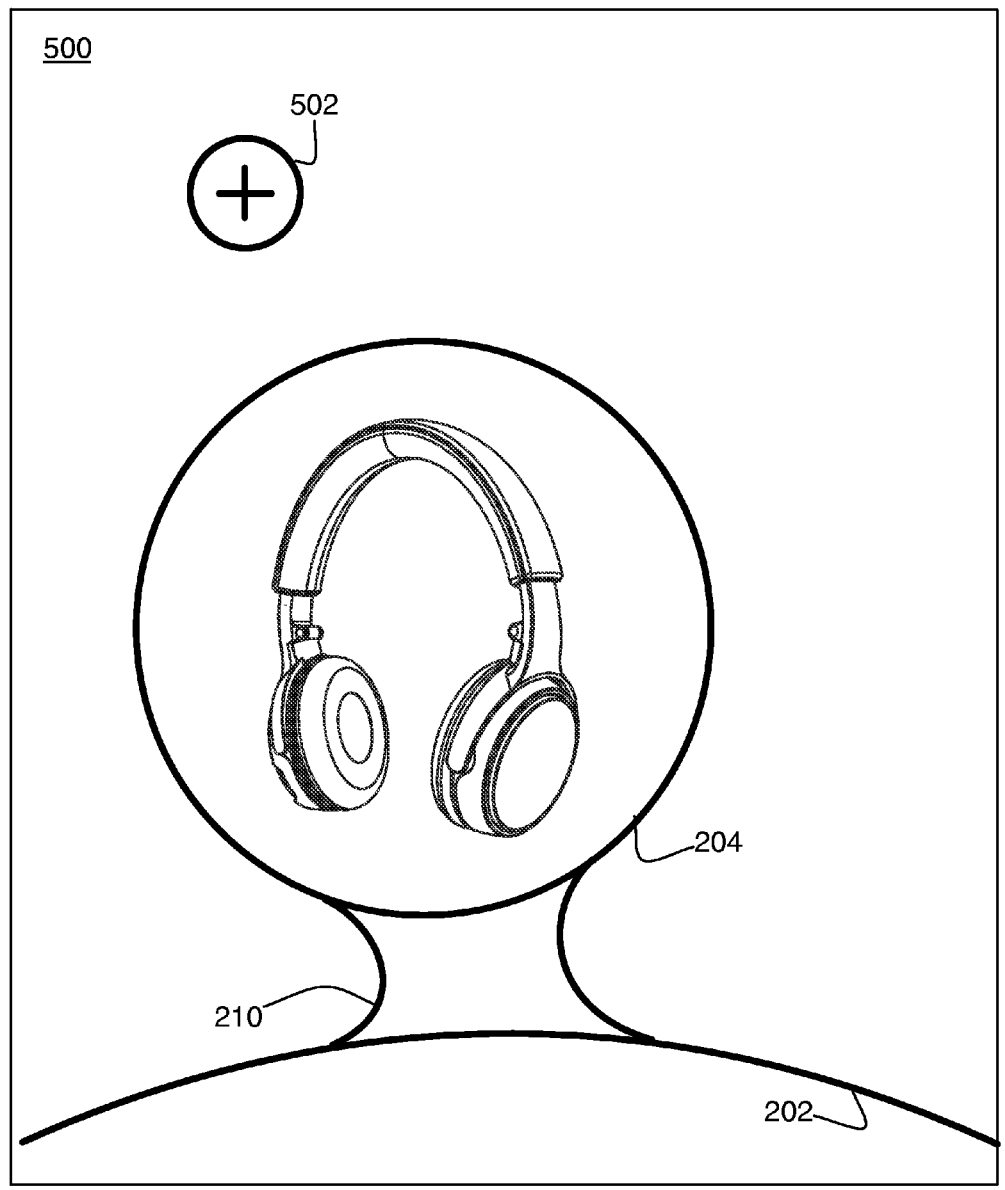
Figure 6:
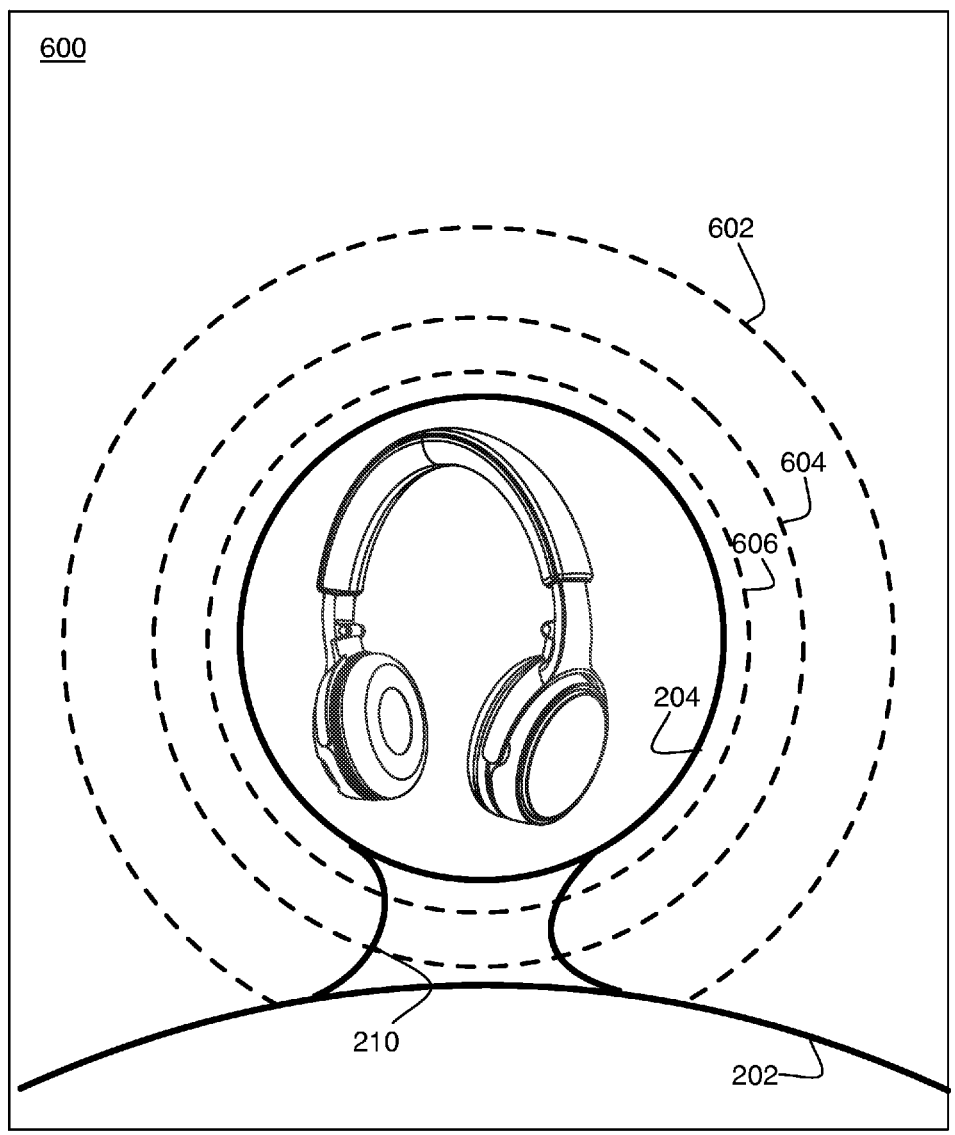
Figure 7:
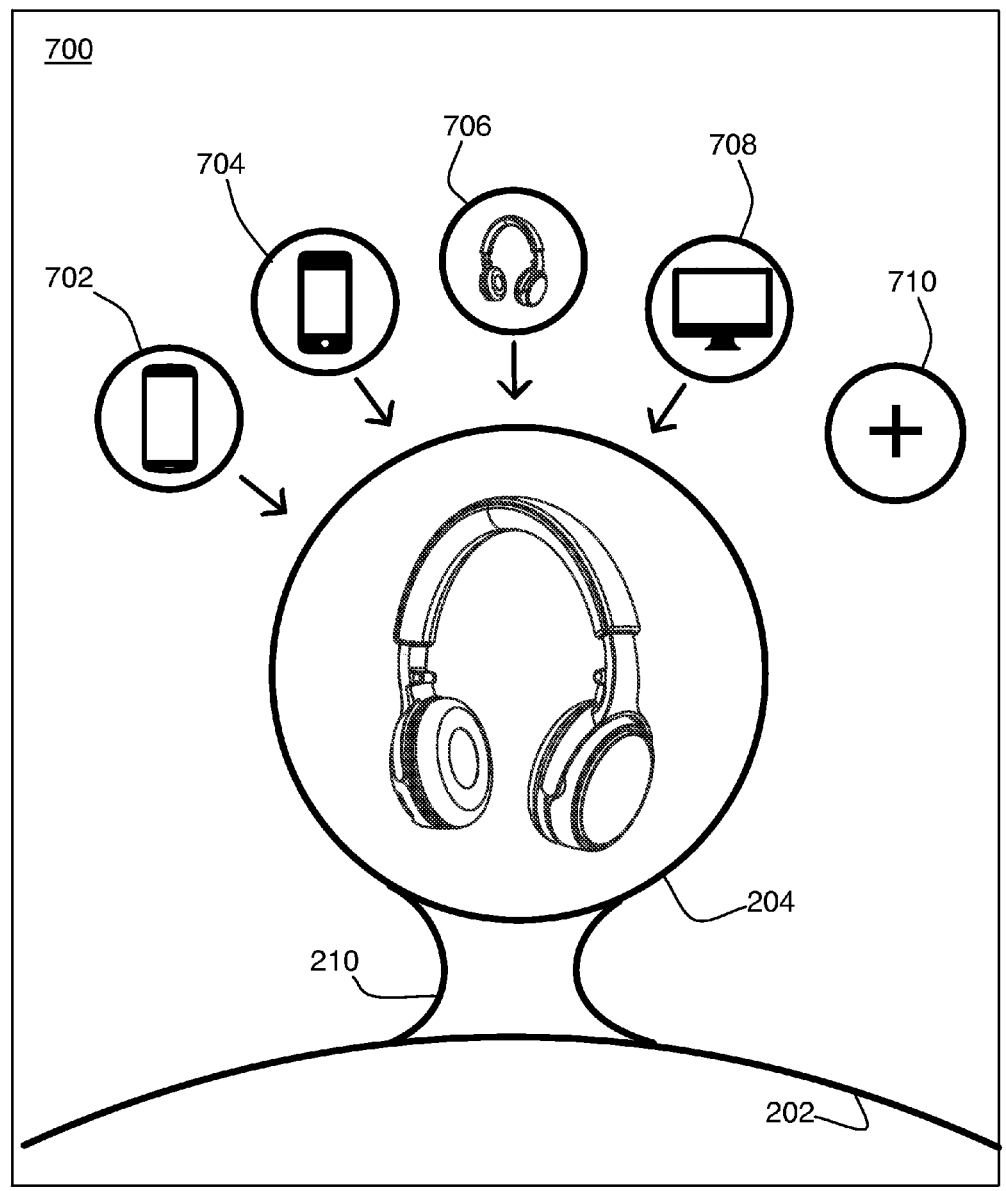

Going the other direction, screens 500 in FIG. 5, 600 in FIG. 6, and 700 in FIG. 7 show the interface for connecting additional devices (such as another one of the mobile phones) to the headphones. In screen 500, a circle 502 with a plus sign is shown near the circle 204 for the headphones. Tapping that circle 502 puts the headphones into a pairing mode. If no other devices are currently paired with the headphones, the interface shows screen 600. In screen 600, circles 602, 604, 606 radiating from the headphones' circle 204 indicate that the headphones are now broadcasting their availability for pairing to other devices that might be in the area. In other examples, a glowing field, rather than radiating circles, may be used. This screen might be used whenever the headphones are in pairing mode, whether initiated through the interface of screen 500 or by the headphones' own user interface.

When other devices are already paired with the headphones, screen 700 in FIG. 7 is used. In screen 700, additional circles 702, 704, 706, 708 representing previously paired devices, which aren't currently connected, are arrayed around the circle 204 representing the headphones. Another circle 710 contains a plus sign, for indicating that the user wishes to pair yet another device. A user may connect the headphones to one of the already-paired devices by simply dragging that device's circle onto the circle representing the headphones. Doing so will return the user to screen 200 in FIG. 2, showing the other connected device as a second circle connected to the headphones' circle. Some intermediate animation may be used to show that the connection is being established.

Note that one of the available devices in screen 700 is not a source device, but is another set of headphones, in circle 706. For some wireless technologies or device architectures, it may be possible for two output devices to be connected to each other, to engage in a variety of peer-to-peer activities, such as direct voice communication or music sharing, or in the case of both devices being out-loud speakers, to provide stereo playback through the two speakers, to name some examples. The same interface used to connect other source devices to the headphones can be used to connect such peer devices. When connected, an additional prompt may be used to ask the user what functions are desired, and the user may be able to control the second output device via a relay through the first output device.

Figure 8:
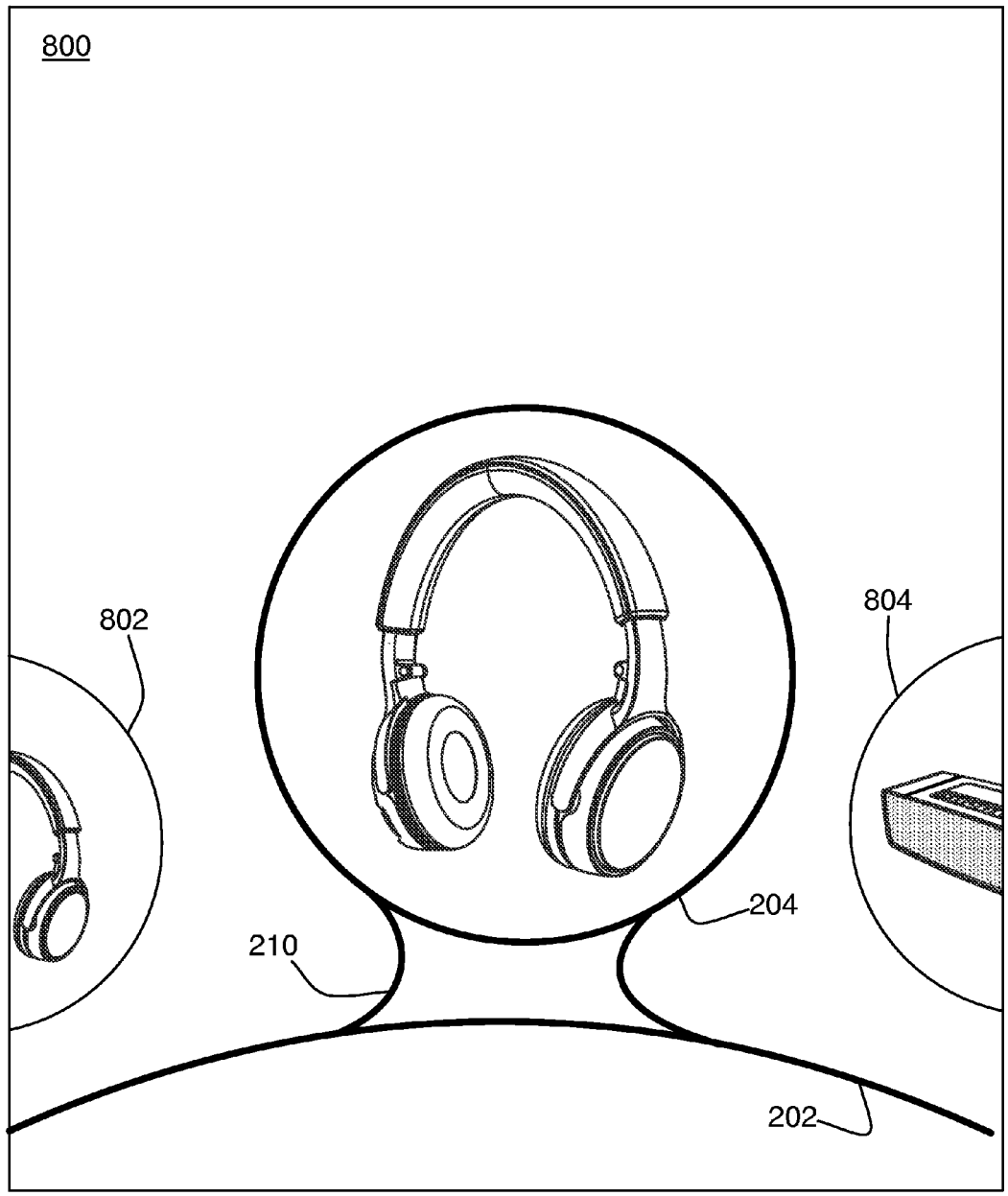

While screen 7 allows a user to connect an additional source device to a single output device, the user may also want to connect a different output device to the device displaying the user interface, whether as an additional output device or in place of the one in use. As shown in screen 800 in FIG. 8, the interface can display other nearby, or previously paired, output devices in additional circles 802, 804, on either side of the circle 204 for the presently controlled device. In some example, tapping one of these other devices may bring up information about it, and dragging it onto the arc 202 representing the device on which the interface is running causes that output device to be connected.

Figure 9:
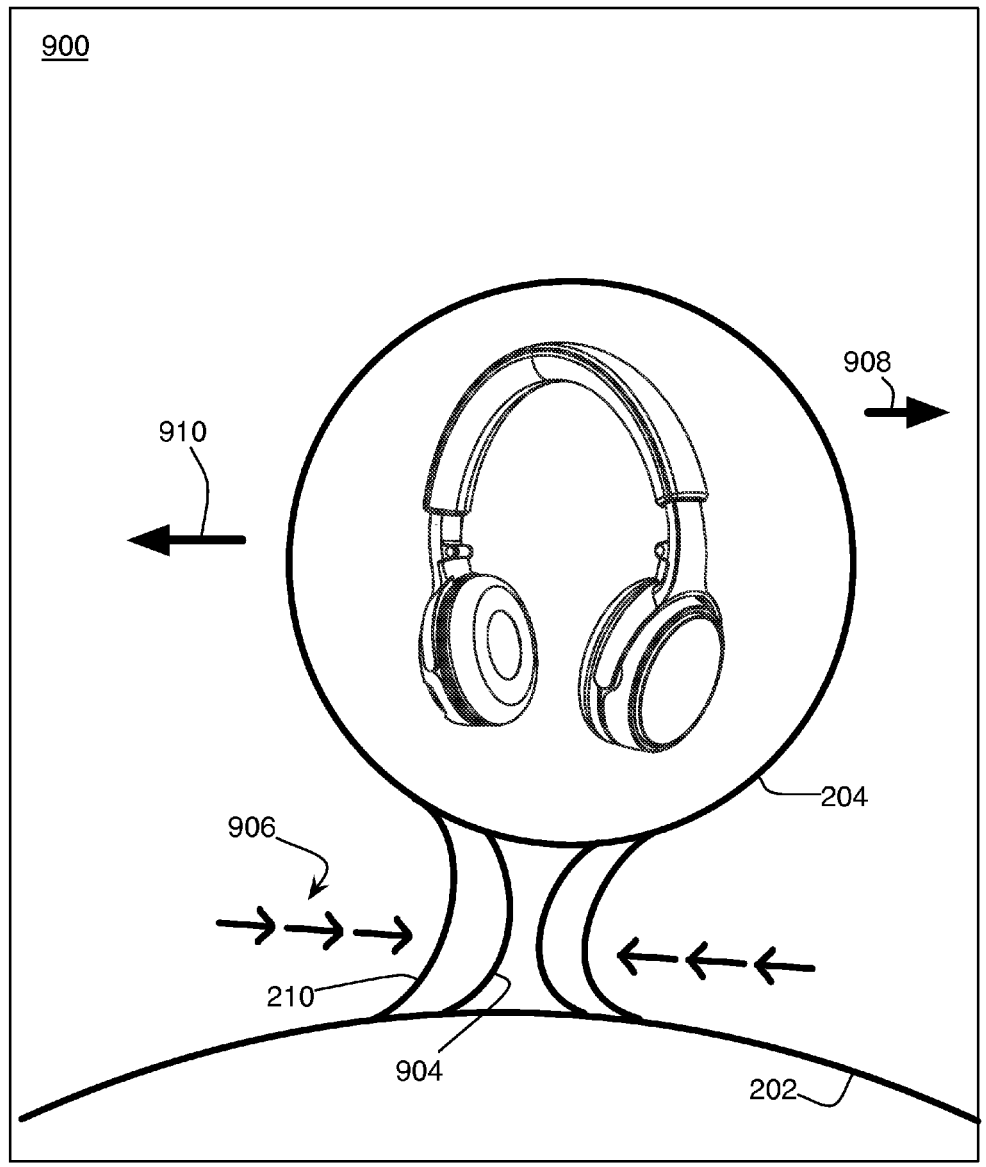

In FIG. 9, a screen 900 shows how the curved connector 210 between connected devices can also indicate the strength of the signal over which the devices are connected. As the signal strength weakens, the neck of the connector narrows, to narrower connection 904, intuitively indicating a weaker connection between the device displaying the screen 900, represented by the arc 202, and the device represented by the circle 204 (i.e., the headphones from FIG. 1). This weakening can be animated, with the connector 210 visibly narrowing or thickening as the connection strength varies, indicated by arrows 906 in this figure, or with animated shadows continuously moving in the direction of the arrows to show a weakened signal.

An additional element shown in FIG. 9, by arrows 908 and 910, is that the circle 204 representing the headphones may drift back and forth on the screen, giving the user an intuitive indication that the connection is live but variable, e.g., that it represents a wireless connection between separate devices. As the circle 204 moves around, the connector 210 stretches and moves accordingly to maintain the link between the arc 202 and the circle 204.

Figure 10A:
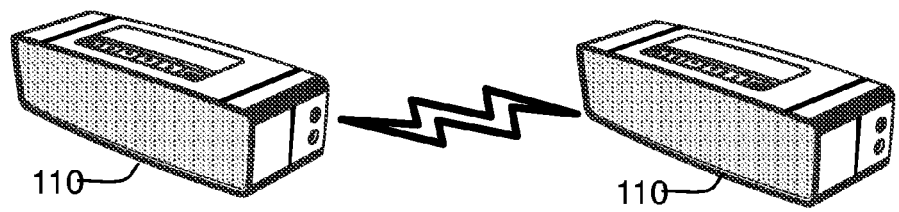
FIGS. 10A though 10C show pairs of interconnected electronic devices.
Figure 10B:
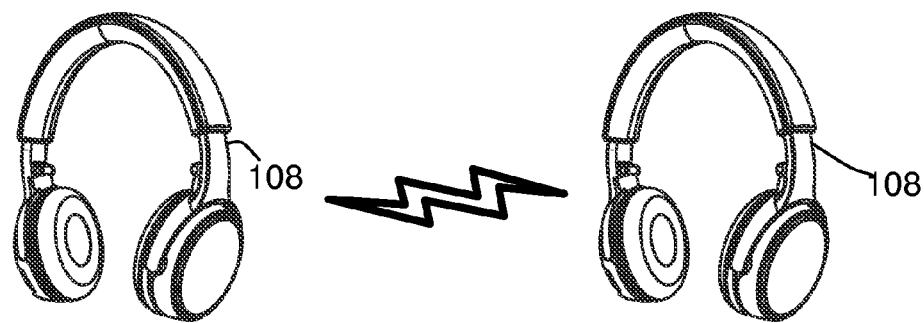
Figure 10C:
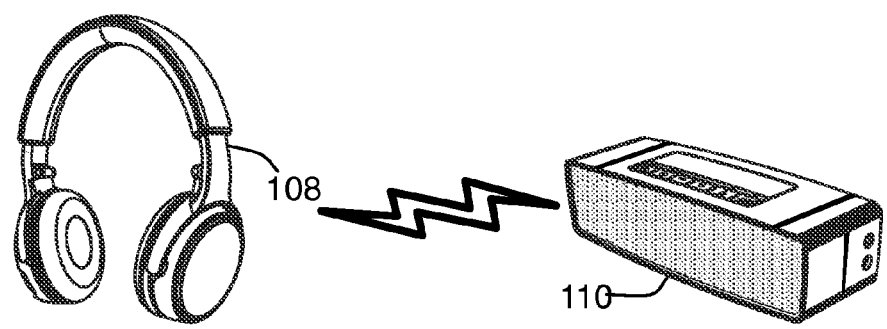

As mentioned above in the description of FIG. 7, two output devices may be connected to each other, and their relationship controlled using the user interface described in this application. In particular, three possible combinations of devices are shown in FIGS. 10A-10C. While these all involve audio transmission between audio output devices, the particular types of devices involved cause the resulting communication to provide significantly different experiences for their users.

In FIG. 10A, two speakers 110 are connected to each other. In one common implementation, this allows one speaker to share the audio it receives from another source with the other speaker, to expand the sound stage, or to provide a stereo pair. If one or both of the speakers also has a microphone, however, a different mode is possible, that of a baby monitor (one or two-way, if both devices have microphones).

In FIG. 10B, two headsets 108 are connected to each other. As with the speakers, this may allow audio sharing. In addition, using the microphones in the headsets provides a walkie-talkie style communication experience. This is essentially the same as the two-way baby monitor mode, but because of the different form factors, it results in a very different experience, causing users to regard it as an entirely different function.

In FIG. 10C, the headset 108 is connected to the speaker 110. In addition to using this for audio sharing, allowing multiple people to hear what the headset user is listening to, this combination allows another new feature, that of public address. That is, by transmitting signals from the headset microphone to the speaker for playback, the combination is transformed into a public address system. As before, this is not electronically different from the baby monitor or walkie-talkie modes, but because of the products involved, the user experience is different and unique.

Figure 11:
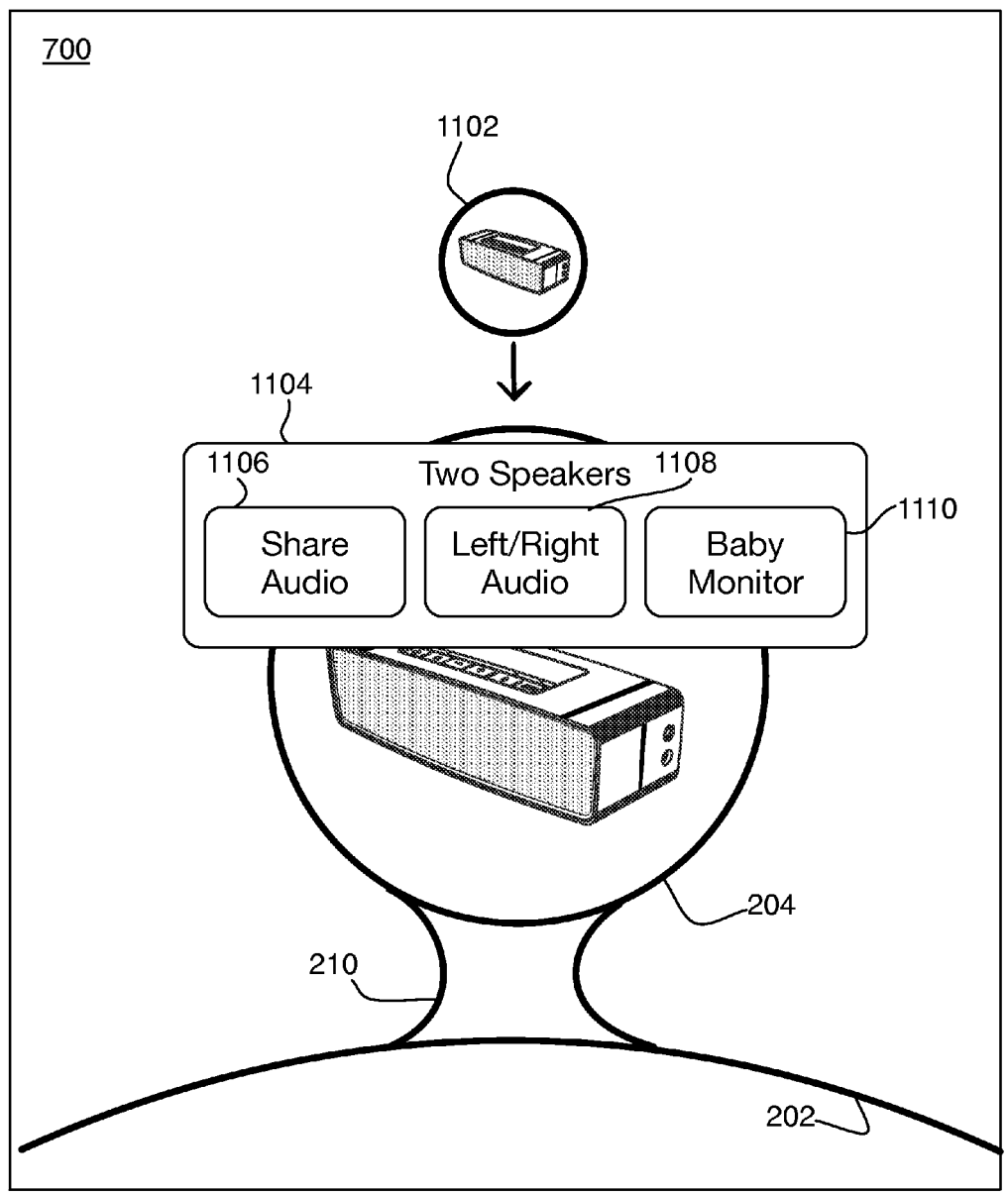
Figure 12:
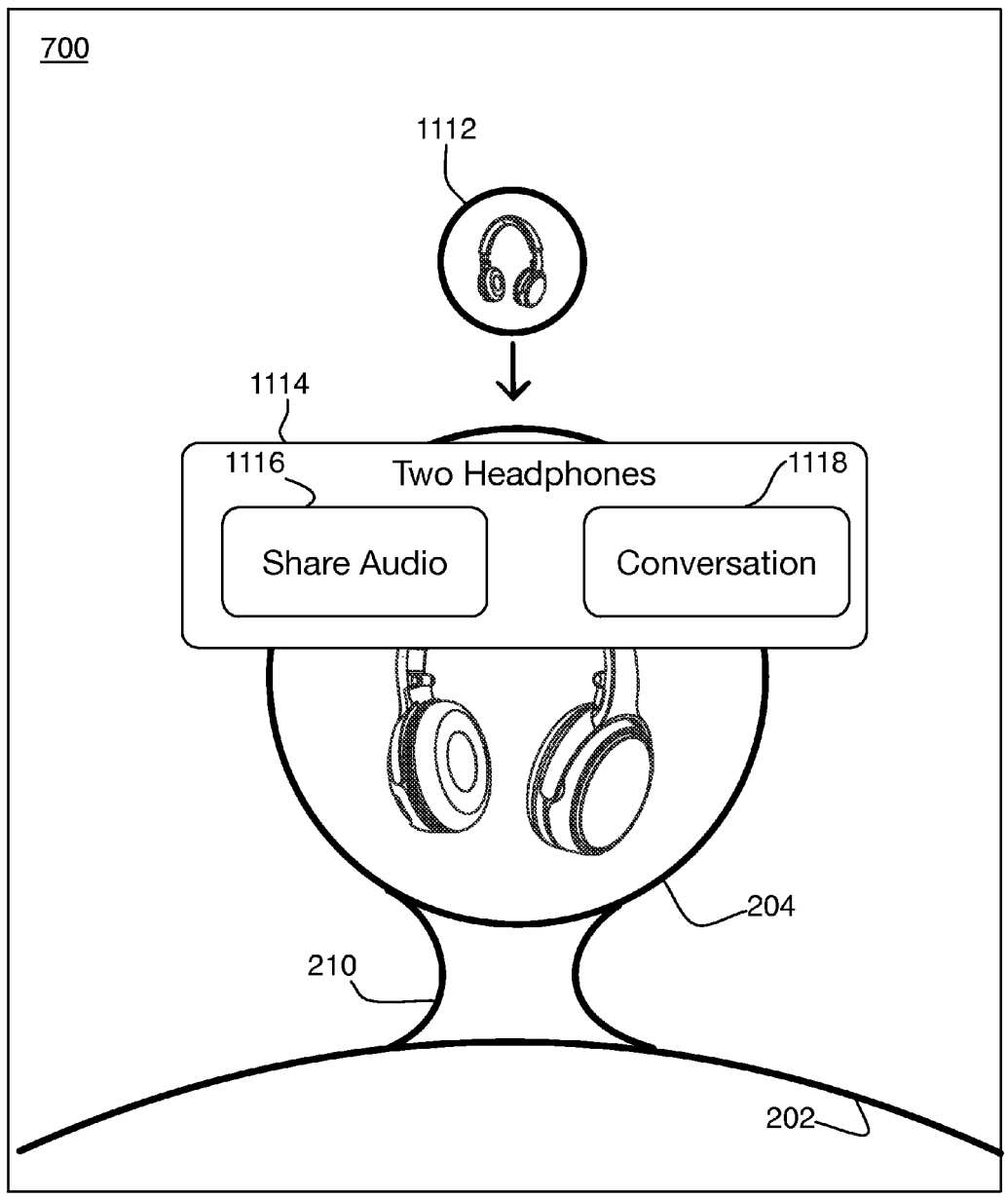
Figure 13:
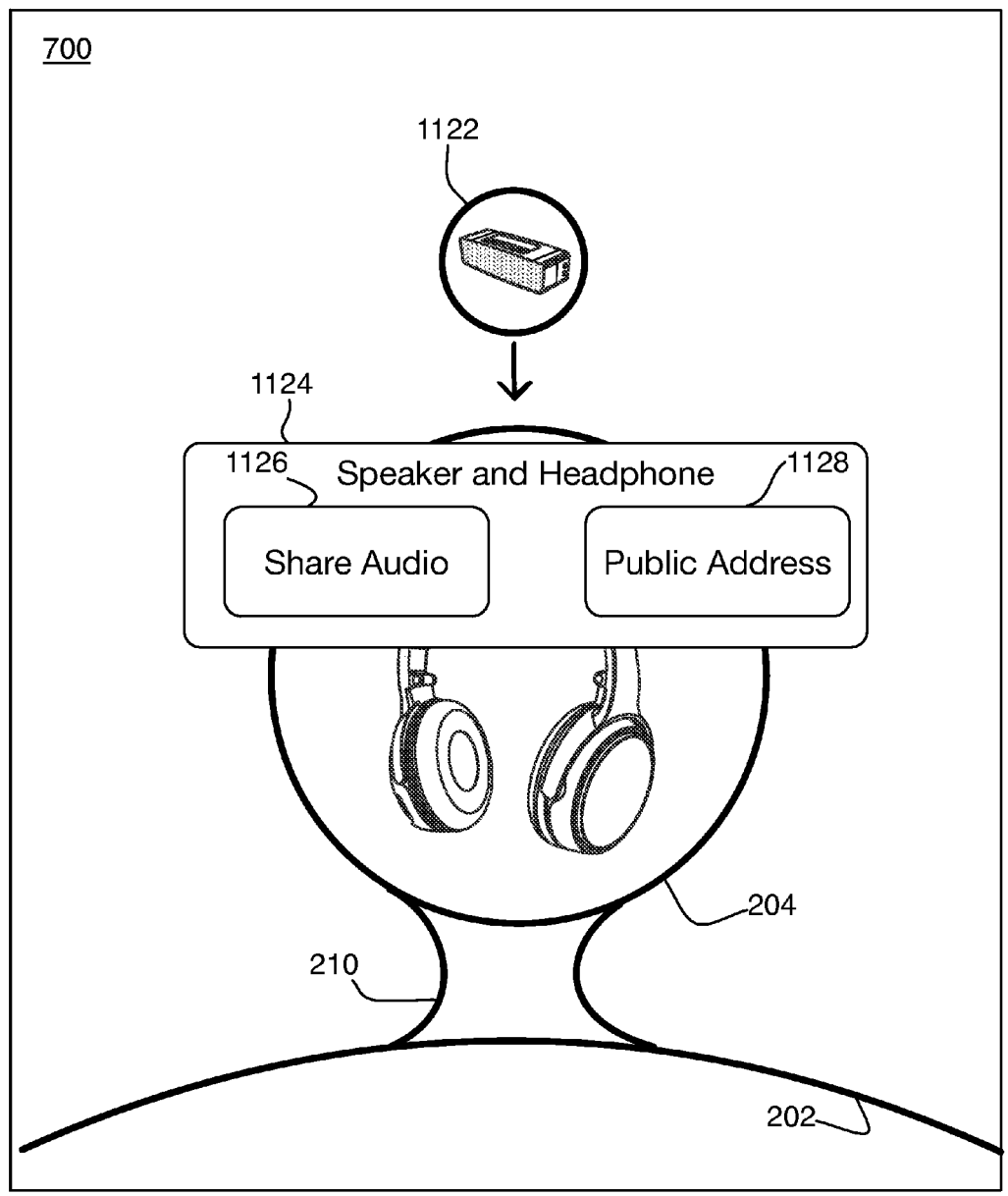

The user interface for configuring these experiences begins with that shown in FIG. 7, where the user drags a second audio output device onto the circle representing the first output device. The type and properties of the devices involved determines which screen is shown next. Three options, corresponding to the combinations in FIGS. 10A-10C, are shown in FIGS. 11, 12, and 13. In FIG. 11, a second speaker 1102 has been dragged onto the circle 204 showing the already-connected speaker. A prompt 1104 notes that this connects two speakers, and presents three options. Button 1106 lets the user share the audio, button 1108 configures the two speakers as a left-right pair, and button 1110 places them into a baby monitor mode. Depending on which option is selected, additional screens (not shown) may provide controls such as balance control, for the stereo pair option, or a push-to-talk control for the parent's end of the baby monitor mode. The baby monitor mode may also allow the user of the computing device to select different audio for reproduction at each of the speakers, such as lullabies for the baby end and soothing white noise for the parent end.

In FIG. 12, a second set of headphones 1112 has been dragged onto the circle 204 showing the already-connected headphones. A prompt 1114 notes that this connects two headphones, and presents two options. Button 1116 lets the user share the audio, while button 1118 configures the headsets to let the users talk to each other. Similarly, in FIG. 13, a speaker 1122 has been dragged onto the circle 204 showing the already-connected headphones. A prompt 1124 notes that this connects a speaker and headphones, and presents two options. Button 1126 lets the user share the audio, while button 1128 configures the combination into a public address system. If the user selects the public address system, other features of the user interface may also be changed, for example, the volume controls will control the output volume of the remote speaker, not the headphones, or two separate volume controls may be provided. A third option, not shown, could also be offered, reversing the roles, that is, using the headset as a remote listing station for audio detected near the loudspeaker. Alternatively, which of the PA mode and the remote-listening mode is presented may depend on which device was already connected, and which was dragged onto it.

As shown and described in this application, the user interface is displayed on the screen of a computing device, such as a tablet computer. Examples include the iPad® tablet from Apple, Inc., the Surface™ computer from Microsoft Corporation, or one of the many tablets running the Android™ operating system from Google, Inc. The user interface described herein can also be used on other devices, such as smart phones, car audio systems, and laptop or desktop computers. It is generally assumed that the screens used for displaying the user interface are touch-sensitive and the user inputs described above correspond to users touching the screen with their hand or a stylus and information describing such touches being communicated to a processor. In other examples, however, a non-touch screen could be used with a mouse or other pointing device, with similar interactions and effects. The device running the user interface may be referred to as a computing device, or a communication device, without any limitation intended as to the functions of a device using either such description or other descriptions. Generally the device will have a processor used for generating the display, responding to user input, managing the wireless interfaces, and otherwise operating the device. Such functions may be distributed between multiple processors, most commonly a graphics processor and a computing processor. Instructions for such processors may be embedded in the processor, in on-board memory within the device, or loaded as needed from a remote source. In some examples, some of the processing may be done in a remote device, with instructions communicated to the device showing the user interface, for example, in the case of a computer with a wireless display. Any such combination of component devices is within the scope of any claims that are not specifically limited to specific implementations.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, hard disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A system comprising:
a first audio device
a second audio device; and
a computing device having a user interface and a wireless interface for communicating with the first and second audio devices,
wherein the computing device is configured to:
cause the wireless interface to form a first connection with the first audio device and receive first configuration information;
cause the wireless interface to form a second connection with the second audio device and receive second configuration information;
when the first and second configuration information indicate that:
the first audio device is a first loudspeaker including a first microphone, a first speaker, and a first wireless interface for receiving audio signals for reproduction on the first speaker and sending audio signals detected by the first microphone,
the second audio device is a second loudspeaker including a second speaker and a second wireless interface for receiving audio signals for reproduction on the second speaker, and
the first loudspeaker is configurable to send the audio signals detected by the first microphone directly to the second loudspeaker and the second loudspeaker is configurable to receive and reproduce the audio signals received from the first loudspeaker,
present on the user interface representations of both the first and second loudspeakers;
upon receiving user input indicating a connection between the representations of the first and second loudspeakers, inquire from the user whether a first or a second mode is to be used; and upon receiving user input confirming that the first mode is to be used, instruct the first loudspeaker to send the audio signals detected by the first microphone directly to the second loudspeaker, and instruct the second loudspeaker to receive and reproduce the audio signals received from the first loudspeaker, such that in the first mode, a user of the second loudspeaker can hear sounds present near the first loudspeaker, and the user interface identifies the first mode as a baby monitor mode, and in the first mode, the user interface presents the user with an audio playback control that allows the user to select audio for playback on the first loudspeaker, independently of any audio being played back on the second loudspeaker.

2. The system of claim 1, wherein
the second loudspeaker has a second microphone, and the second loudspeaker is configurable to send audio signals detected by the second microphone directly to the first loudspeaker, and the first loudspeaker is configurable to receive and reproduce the audio signals received from the second loudspeaker; and
when in the first mode, the user interface presents the user with a push-to-talk control that, when activated, causes the second loudspeaker to transmit audio signals detected by the second microphone to the first loudspeaker.

3. A system comprising:
a first audio device having a first microphone, a first speaker, and a first wireless interface for receiving audio signals for reproduction on the first speaker and sending audio signals detected by the first microphone;
a second audio device having a second speaker and a second wireless interface for receiving audio signals for reproduction on the second speaker; and
a computing device having a user interface,
wherein the first audio device is configurable to send the audio signals detected by the first microphone directly to the second audio device and the second audio device is configurable to receive and reproduce the audio signals received from the first audio device;
the first and second audio devices are each one of a loudspeaker or a headset; and
the computing device is configured to:
present on the user interface representations of both the first and second audio devices;
upon receiving user input indicating a connection between the representations of the first and second audio devices, inquire from the user whether a first or a second mode is to be used; and
upon receiving user input confirming that the first mode is to be used, instruct the first audio device to send the audio signals detected by the first microphone directly to the second audio device, and instruct the second audio device to receive and reproduce the audio signals received from the first audio device; and
the first mode presented by the user interface is selected based on whether each of the first and second audio devices is a loudspeaker or a headset, and
wherein when one of the first audio device or the second audio device is a headset and the other audio device is a loudspeaker, the user interface identifies the first mode as either a public address mode or a remote listening mode, depending on the order in which the audio devices were connected to the computing device.

4. The system of claim 3, wherein when the first mode corresponds to the public address mode, when a user of the first audio device speaks, the user's voice is reproduced by the second audio device.

5. The system of claim 4, wherein when in the public address mode, the user interface presents the user with volume controls to control output volume of the loudspeaker.

6. The system of claim 3, wherein when the first mode corresponds to the remote listening mode, when sound is present in the environment of the first audio device, the sound is reproduced by the second audio device headset.

7. The system of claim 3, wherein which of the public address mode or remote listening mode is identified depends on which of the first audio device or the second audio device was first connected to the computing device.

8. A computing device comprising:
a user interface;
a wireless interface for communicating with audio devices;
a processor controlling the wireless interface and the user interface, and configured to:
cause the wireless interface to form a first connection with a first audio device and receive first configuration information;
cause the wireless interface to form a second connection with a second audio device and receive second configuration information; and
when the first and second configuration information indicate that:
the first audio device is a first loudspeaker including a first microphone, a first speaker, and a first wireless interface for receiving audio signals for reproduction on the first speaker and sending audio signals detected by the first microphone,
the second audio device is a second loudspeaker including a second speaker and a second wireless interface for receiving audio signals for reproduction on the second speaker, and
the first loudspeaker is configurable to send the audio signals detected by the first microphone directly to the second loudspeaker and the second loudspeaker is configurable to receive and reproduce the audio signals received from the first,
present on the user interface representations of both the first and second loudspeakers;
upon receiving user input indicating a connection between the representations of the first and second loudspeakers, use the user interface to inquire from the user whether a first or a second mode is to be used; and
upon receiving user input confirming that the first mode is to be used, instruct the first loudspeaker to send the audio signals detected by the first microphone directly to the second loudspeaker, and instruct the second loudspeaker to receive and reproduce the audio signals received from the first loudspeaker, such that in the first mode, a user of the second loudspeaker can hear sounds present near the first loudspeaker, and the processor is further configured to cause the user interface to identify the first mode as a baby monitor mode and to present the user with an audio playback control that allows the user to select audio for playback on the first loudspeaker, independently of any audio being played back on the second loudspeaker.

9. The computing device of claim 8, wherein when the first and second configuration information indicate that the second loudspeaker has a second microphone, the second loudspeaker is configurable to send audio signals detected by the second microphone directly to the first loudspeaker, and the first loudspeaker is configurable to receive and reproduce the audio signals received from the second loudspeaker,
the processor is further configured to cause the user interface to present the user with a push-to-talk control that, when activated, causes the second loudspeaker to transmit audio signals detected by the second microphone to the first loudspeaker.

10. A computing device comprising:
a user interface;
a wireless interface for communicating with audio devices;
a processor controlling the wireless interface and the user interface, and configured to:
cause the wireless interface to form a first connection with a first audio device and receive first configuration information;
cause the wireless interface to form a second connection with a second audio device and receive second configuration information; and
when the first and second configuration information indicate that:
the first audio device includes a first microphone, a first speaker, and a first wireless interface for receiving audio signals for reproduction on the first speaker and sending audio signals detected by the first microphone,
the second audio device includes a second speaker and a second wireless interface for receiving audio signals for reproduction on the second speaker,
the first audio device is configurable to send the audio signals detected by the first microphone directly to the second audio device and the second audio device is configurable to receive and reproduce the audio signals received from the first audio device, and
the first and second audio devices are each one of a loudspeaker or a headset,
present on the user interface representations of both the first and second audio devices;
upon receiving user input indicating a connection between the representations of the first and second audio devices, use the user interface to inquire from the user whether a first or a second mode is to be used, wherein the first mode presented by the user interface is selected based on whether each of the first and second audio devices is a loudspeaker or a headset; and
upon receiving user input confirming that the first mode is to be used, instruct the first audio device to send the audio signals detected by the first microphone directly to the second audio device, and instruct the second audio device to receive and reproduce the audio signals received from the first audio device, and
wherein when the first and second configuration information indicate that one of the first audio device or the second audio device is a headset and the other audio device is a loudspeaker,
the processor is further configured to cause the user interface to identify the first mode as either a public address mode or a remote listening mode, depending on the order in which the audio devices were connected to the computing device.

11. The computing device of claim 10, wherein when the first mode corresponds to the public address mode and the first and second configuration information indicate that the first audio device is a headset and the second audio device is a loudspeaker, when a user of the headset speaks, the user's voice is reproduced by the loudspeaker.

12. The computing device of claim 11, wherein when in the public address mode, the processor is further configured to present on the user interface volume controls to control output volume of the loudspeaker.

13. The computing device of claim 10, wherein when the first mode corresponds to the remote listening mode and the first and second configuration information indicate that the first audio device is a loudspeaker and the second audio device is a headset, when sound is present in the environment of the loudspeaker, the sound is reproduced by the headset.

14. The computing device of claim 10, wherein which of the public address mode or remote listening mode is identified depends on which of the first audio device or the second audio device was first connected to the computing device.

15. A method of operating a system comprising
a first audio device
a second audio device; and
a computing device having a user interface and a wireless interface for communicating with the first and second audio devices,
the method comprising:
  causing the wireless interface to form a first connection with the first audio device and receive first configuration information;
  causing the wireless interface to form a second connection with the second audio device and receive second configuration information;
  when the first and second configuration information indicate that:
    the first audio device is a first loudspeaker including a first microphone, a first speaker, and a first wireless interface for receiving audio signals for reproduction on the first speaker and sending audio signals detected by the first microphone,
    the second audio device is a second loudspeaker including a second speaker and a second wireless interface for receiving audio signals for reproduction on the second speaker, and
    the first loudspeaker is configurable to send the audio signals detected by the first microphone directly to the second loudspeaker and the second loudspeaker is configurable to receive and reproduce the audio signals received from the first loudspeaker,
  presenting on the user interface representations of both the first and second loudspeakers;
  upon receiving user input indicating a connection between the representations of the first and second loudspeakers, inquiring from the user whether a first or a second mode is to be used; and
  upon receiving user input confirming that the first mode is to be used, instructing the first loudspeaker to send the audio signals detected by the first microphone directly to the second loudspeaker, and instructing the second loudspeaker to receive and reproduce the audio signals received from the first loudspeaker, such that in the first mode, a user of the second loudspeaker can hear sounds present near the first loudspeaker, and the first mode is identified on the user interface as a baby monitor mode; and
  when in the first mode, presenting the user with an audio playback control that allows the user to select audio for playback on the first loudspeaker, independently of any audio being played back on the second loudspeaker.

16. The method of claim 15, wherein
the second loudspeaker has a second microphone, and the second loudspeaker is configurable to send audio signals detected by the second microphone directly to the first loudspeaker, and the first loudspeaker is configurable to receive and reproduce the audio signals received from the second loudspeaker; and
when in the first mode, the method further comprises:
  presenting on the user interface a push-to-talk control that, when activated, causes the second loudspeaker to transmit audio signals detected by the second microphone to the first loudspeaker.

* * * * *